United States Patent
Clay

(10) Patent No.: US 10,311,242 B2
(45) Date of Patent: Jun. 4, 2019

(54) DISTRIBUTED SYSTEM RESOURCE LIENS

(71) Applicant: Google Inc., Mountain View, CA (US)

(72) Inventor: Buckner Clay, San Francisco, CA (US)

(73) Assignee: Google LLC, Mountain View, CA (US)

( * ) Notice: Subject to any disclaimer, the term of this patent is extended or adjusted under 35 U.S.C. 154(b) by 115 days.

(21) Appl. No.: 15/497,096

(22) Filed: Apr. 25, 2017

(65) Prior Publication Data

US 2018/0309613 A1    Oct. 25, 2018

(51) Int. Cl.
| | |
|---|---|
| G06F 21/12 | (2013.01) |
| G06F 21/33 | (2013.01) |
| G06F 21/62 | (2013.01) |
| H04L 12/863 | (2013.01) |

(52) U.S. Cl.
CPC .............. *G06F 21/62* (2013.01); *G06F 21/12* (2013.01); *G06F 21/335* (2013.01); *G06F 21/629* (2013.01); *H04L 47/50* (2013.01); *G06F 2221/21* (2013.01); *G06F 2221/2141* (2013.01)

(58) Field of Classification Search
CPC ... H04L 47/50; H04L 29/08144; G06F 21/12; G06F 21/62
See application file for complete search history.

(56) References Cited

U.S. PATENT DOCUMENTS

| | | | |
|---|---|---|---|
| 7,457,848 B2* | 11/2008 | Kon ...................... | G06F 21/31 709/217 |
| 2010/0211416 A1* | 8/2010 | Frank .................... | G06Q 40/00 705/4 |
| 2010/0274910 A1* | 10/2010 | Ghanaie-Sichanie ........................ | H04L 9/3234 709/229 |
| 2012/0271950 A1* | 10/2012 | Yamaji ................ | H04L 41/0896 709/226 |
| 2014/0280248 A1* | 9/2014 | Bester ................. | G06F 17/3051 707/754 |
| 2016/0021197 A1 | 1/2016 | Pogrebinsky et al. | |
| 2016/0293133 A1* | 10/2016 | Dutt ........................ | G06F 8/20 |

* cited by examiner

*Primary Examiner* — El Hadji M Sall
(74) *Attorney, Agent, or Firm* — Honigman LLP

(57) ABSTRACT

A method for accessing liens on resources of distributed systems is provided. The method includes receiving an operation control request. The operation control request identifies a lien requestor, a resource of a distributed system, and at least one restricted operation for the resource of the distributed system. The method also includes associating an operation control lien with the resource of the distributed system based on the operation control request. The operation control lien identifies the lien requestor and the at least one restricted operation for the resource of the distributed system. The method further includes: receiving an operation request to execute a corresponding operation on the resource of the distributed system; determining that the corresponding operation of the operation request is a restricted operation identified by the operation control lien associated with the resource of the distributed system; and restricting execution of the corresponding operation of the operation request.

32 Claims, 11 Drawing Sheets

DISTRIBUTED SYSTEM RESOURCE LIENS

TECHNICAL FIELD

This disclosure relates to assessing liens on resources of distributed systems.

BACKGROUND

A distributed system may include many interconnected hardware and software resources. Due to the vast number of resources in a distributed system, some distributed systems are very complex and difficult to understand. Moreover, in large distributed systems, some resources may affect the operation of other resources. As the size of a distributed system increases, it becomes increasingly difficult to ascertain the effect of a particular resource on other resources in the distributed system.

SUMMARY

One aspect of the disclosure provides a method for accessing liens on resources of distributed systems. The method includes receiving, at data processing hardware, an operation control request. The operation control request identifies a lien requestor, a resource of a distributed system, and at least one restricted operation for the resource of the distributed system. The method also includes associating, by the data processing hardware, an operation control lien with the resource of the distributed system based on the operation control request. The operation control lien identifies the lien requestor and the at least one restricted operation for the resource of the distributed system. The method further includes: receiving, at the data processing hardware, an operation request to execute a corresponding operation on the resource of the distributed system; determining, by the data processing hardware, that the corresponding operation of the operation request is a restricted operation identified by the operation control lien associated with the resource of the distributed system; and restricting, by the data processing hardware, execution of the corresponding operation of the operation request.

Implementations of the disclosure may include one or more of the following optional features. In some implementations, restricting execution of the corresponding operation includes denying execution of the corresponding operation. The method may also include: receiving, at the data processing hardware, a subsequent operation request to execute the corresponding operation on the resource of the distributed system; determining, by the data processing hardware that the corresponding operation of the subsequent operation request is an unrestricted operation not identified by any operation control lien associated with the resource of the distributed system; and allowing, by the data processing hardware, unrestricted execution of the corresponding operation.

In some examples, the method includes receiving, at the data processing hardware, a lien requestor existence indicator indicating that the lien requestor of the operation control request no longer exists and disassociating, by the data processing hardware, any operation control liens based on any operation control requests of the lien requestor from any corresponding resources of the distributed system. The method may also include receiving, at the data processing hardware, a remove request from the lien requestor and disassociating, by the data processing hardware, the corresponding operation control lien from the resource of the distributed system. The remove request may identify the resource of the distributed system and the corresponding associated operation control lien previously requested by the lien requestor.

In some implementations, the method includes returning, from the data processing hardware, a message indicating the corresponding restricted operation for the resource of the distributed system. The message may indicate the lien requestor. The operation control request may also identify an operation control description and the message may indicate the operation control description. Determining that the corresponding operation of the operation request is the restricted operation may include: determining a parent-child relationship between the resource of the distributed system and other resources of the distributed system; determining that the resource of the distributed system is a parent resource having at least one depending child resource; and determining that the parent resource has at least one associated operation control lien. The method may further include receiving, at the data processing hardware, an update request from the lien requestor and updating, by the data processing hardware, the corresponding operation control lien associated with the of the resource of the distributed system as identifying the at least one updated restricted operation. The update request may identify the resource of the distributed system, the corresponding associated operation control lien, and at least one updated restricted operation for the control lien.

Another aspect of the disclosure provides a system for accessing liens on resources of distributed systems. The system includes data processing hardware and memory hardware in communication with the data processing hardware. The memory hardware stores instructions that when executed on the data processing hardware cause the data processing hardware to perform operations. The operations include receiving an operation control request and associating an operation control lien with the resource of the distributed system based on the operation control request. The operation control request identifies a lien requestor, a resource of a distributed system, and at least one restricted operation for the resource of the distributed system. The operation control lien identifies the lien requestor and the at least one restricted operation for the resource of the distributed system. The operations also include: receiving an operation request to execute a corresponding operation on the resource of the distributed system; determining that the corresponding operation of the operation request is a restricted operation identified by the operation control lien associated with the resource of the distributed system; and restricting execution of the corresponding operation of the operation request.

This aspect may include one or more of the following optional features. In some implementations, restricting execution of the corresponding operation includes denying execution of the corresponding operation. The operations may also include receiving a subsequent operation request to execute the corresponding operation on the resource of the distributed system, determining that the corresponding operation of the subsequent operation request is an unrestricted operation not identified by any operation control lien associated with the resource of the distributed system, and allowing unrestricted execution of the corresponding operation. The operations may further include receiving a lien requestor existence indicator indicating that the lien requestor of the operation control request no longer exists and disassociating any operation control liens based on any operation control requests of the lien requestor from any corresponding resources of the distributed system.

In some examples, the operations include receiving a remove request from the lien requestor and disassociating the corresponding operation control lien from the resource of the distributed system. The remove request may identify the resource of the distributed system and the corresponding associated operation control lien previously requested by the lien requestor. The operations may also include returning, from the data processing hardware, a message indicating the corresponding restricted operation for the resource of the distributed system. The message may indicate the lien requestor.

In some implementations, the operation control request further identifies an operation control description and the message indicates the operation control description. Determining that the corresponding operation of the operation request is the restricted operation may include: determining a parent-child relationship between the resource of the distributed system and other resources of the distributed system; determining that the resource of the distributed system is a parent resource having at least one depending child resource; and determining that the parent resource has at least one associated operation control lien. The operations may further include receiving an update request from the lien requestor and updating the corresponding operation control lien associated with the resource of the distributed system as identifying the at least one updated restricted operation. The update request may identify the resource of the distributed system, the corresponding associated operation control lien, and at least one updated restricted operation for the control lien.

Yet another aspect of the disclosure provides a second method for accessing liens on resources of distributed systems. The method includes receiving, at the data processing hardware, an operation request to execute a corresponding operation on a resource of a distributed system and determining, by the data processing hardware, that the resource of the distributed system has an associated operation control lien. The operation control lien identifies a lien requestor and at least one restricted operation for the resource of the distributed system. The method also includes determining, by the data processing hardware, that the corresponding operation of the operation request is a restricted operation identified by the operation control lien associated with the resource of the distributed system and restricting, by the data processing hardware, execution of the corresponding operation of the operation request on the resource of the distributed system.

This aspect may include one or more of the following optional features. In some implementations, restricting execution of the corresponding operation of the operation request may include denying execution of the corresponding operation. The method may also include: receiving, at the data processing hardware, a subsequent operation request to execute the corresponding operation on the resource of the distributed system; determining, by the data processing hardware that the corresponding operation of the subsequent operation request is an unrestricted operation not identified by any operation control lien associated with the resource of the distributed system; and allowing, by the data processing hardware, unrestricted execution of the corresponding operation. The method may also include receiving, at the data processing hardware, a lien requestor existence indicator indicating that the lien requestor no longer exists and disassociating, by the data processing hardware, any operation control liens identifying the lien requestor from any corresponding resources of the distributed system.

In some examples, the method includes receiving, at the data processing hardware, a remove request from the lien requestor and disassociating, by the data processing hardware, the corresponding operation control lien from the resource of the distributed system. The remove request may identify the resource of the distributed system and the corresponding associated operation control lien previously requested by the lien requestor. The method may further include returning, from the data processing hardware, a message indicating the corresponding restricted operation for the resource of the distributed system, the message indicating the lien requestor.

Yet another aspect of the disclosure provides a system for accessing liens on resources of distributed systems. The system includes data processing hardware and memory hardware in communication with the data processing hardware. The memory hardware stores instructions that when executed on the data processing hardware cause the data processing hardware to perform operations. The operations include receiving an operation request to execute a corresponding operation on a resource of a distributed system and determining that the resource of the distributed system has an associated operation control lien. The operation control lien identifies a lien requestor and at least one restricted operation for the resource of the distributed system. The operations also include determining that the corresponding operation of the operation request is a restricted operation identified by the operation control lien associated with the resource of the distributed system and restricting execution of the corresponding operation of the operation request on the resource of the distributed system.

This aspect may include one or more of the following optional features. In some implementations, restricting execution of the corresponding operation of the operation request includes denying execution of the corresponding operation. The operations may also include receiving a subsequent operation request to execute the corresponding operation on the resource of the distributed system, determining that the corresponding operation of the subsequent operation request is an unrestricted operation not identified by any operation control lien associated with the resource of the distributed system and allowing unrestricted execution of the corresponding operation. The operations may further include receiving a lien requestor existence indicator indicating that the lien requestor no longer exists and disassociating any operation control liens identifying the lien requestor from any corresponding resources of the distributed system.

In some examples, the operations include receiving a remove request from the lien requestor and disassociating the corresponding operation control lien from the resource of the distributed system. The remove request may identify the resource of the distributed system and the corresponding associated operation control lien previously requested by the lien requestor. The operations may also include returning, from the data processing hardware, a message indicating the corresponding restricted operation for the resource of the distributed system, the message indicating the lien requestor.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Typically, a distributed system offers several advantages. The distributed system may have a greater amount of system resources accessible to users of the distributed system and also have a greater amount of computing power to perform operations for users. However, because distributed systems share system resources, the use of one resource may become dependent on another resource. With such dependencies, modification or deletion of a resource may have a detrimental or a catastrophic impact on tasks or resources depending on the modified or the deleted resource. For example, applications that rely on a resource or resources for interoperability become inoperable without those underlying resources. Thus, systems with shared resources have a need to warn or to prevent other users that attempt to modify or to delete a resource within the system that is being used in other capacities. Much like how a property lien stakes a legal claim on tangible property, a resource lien serves to indicate a computing claim on a distributed system resource. Therefore, the resource lien may function as a recordation of the use of a resource and prevent damage to other tasks or resources depending on that resource. For example, a system and/or method of assessing a resource lien may provide reference to a resource with a lien, may provide a representation of who or what generated the resource lien, and may provide an explanation of why the resource lien exists while constraining or permitting various actions on the resource lien, such as creating a new resource lien, updating an existing lien, or removing an existing lien.

Figure 1:
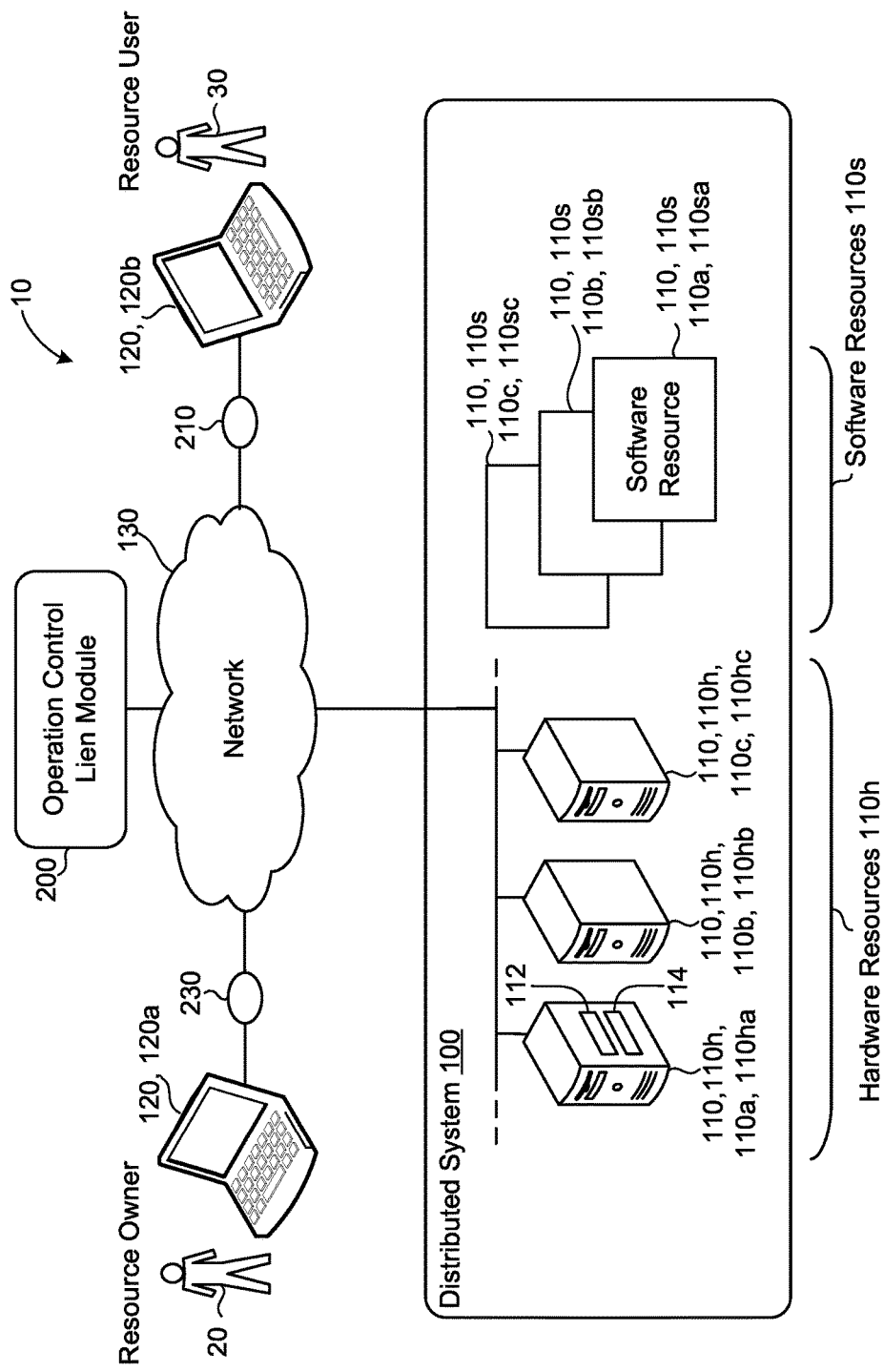
FIG. 1 is a block diagram of an example resource lien environment.

FIG. 1 depicts an example resource lien environment 10 for managing a distributed system 100 with an operation control lien module 200. The operation control lien module 200 can access the distributed system 100 via a network 130. An entity, such as a resource owner 20 or a resource user 30, may use a computer 120 (e.g., 120a and 120b) to access the distributed system 100 and/or the operation control lien module 200. Although, in the example of FIG. 1, the operation control lien module 200 is shown as separate from the distributed system 100, in other implementations the operation control lien module 200 may be a part of the distributed system 100. In other words, the operation control lien module 200 may be implemented using the resources 110 of the distributed system 100.

The resource lien environment 10 includes the resource owner 20 who is an entity in charge of a resource 110 of the distributed system 100. For example, the resource owner 20 is a creator of a resource 110 or an entity designated with privileges/permissions to manage the resource 110. As the entity in charge of the resource 110, the resource owner 20 has access privileges (e.g., root privileges) to the corresponding resource 110, such as read or write access. Therefore, the resource owner 20 may modify or delete the resource 110 managed by the resource owner 20. In the resource lien environment 10, when the resource owner 20 seeks to perform an operation (e.g., modify, edit, update, delete, etc.) on the resource 110, the resource owner 20 generates an operation request 230. The operation control lien module 200 receives the operation request 230 from the resource owner 20 and informs the resource owner 20 if the operation is encumbered by an operation control lien 220. Each resource 110 of the distributed system 100 has a corresponding resource owner 20. In some examples, if the resource owner 20 corresponding to a given resource 110 is undefined, the distributed system 100 may designate a default resource owner 20.

Referring further to FIG. 1, the resource lien environment 10 includes the resource user 30. The resource user 30 is an entity that decides to use a resource 110 that corresponds to the resource owner 20. For example, the resource user 30 may be an entity that has access to resources 110 of the distributed system 100. When the resource user 30 decides to use a resource 110 of the distributed system 100, the resource user 30 generates an operation control request 210 to identify the use of the corresponding resource 110 by the resource user 30. The operation control lien module 200 receives the operation control request 210 from the resource user 30 and generates an operation control lien 220 for the corresponding resource 110.

Generally, resources 110 of the distributed system 100 may include hardware resources 110h and software resources 110s. The hardware resources 110h include data processing hardware 112 and memory hardware 114. The software resources 110s may include software applications, software services, application programming interfaces (APIs) or the like. The software resources 110s may reside on the hardware resources 110h (e.g., stored in the memory hardware 114) or may include instructions executed on the data processing hardware 112.

A software application (i.e., a software resource 110s) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The memory hardware 114 is non-transitory memory that may be physical devices used to store programs (e.g., sequences of instructions) or data (e.g., program state information) on a temporary or permanent basis for use by data processing hardware 112. The memory hardware 114 may be volatile and/or non-volatile addressable semiconductor memory. Examples of non-volatile memory include, but are not limited to, flash memory and read-only memory (ROM)/ programmable read-only memory (PROM)/erasable programmable read-only memory (EPROM)/electronically erasable programmable read-only memory (EEPROM) (e.g., typically used for firmware, such as boot programs) as well as disks or tapes. Examples of volatile memory include, but are not limited to, random access memory (RAM), dynamic random access memory (DRAM), static random access memory (SRAM), and phase change memory (PCM).

Figure 2A:
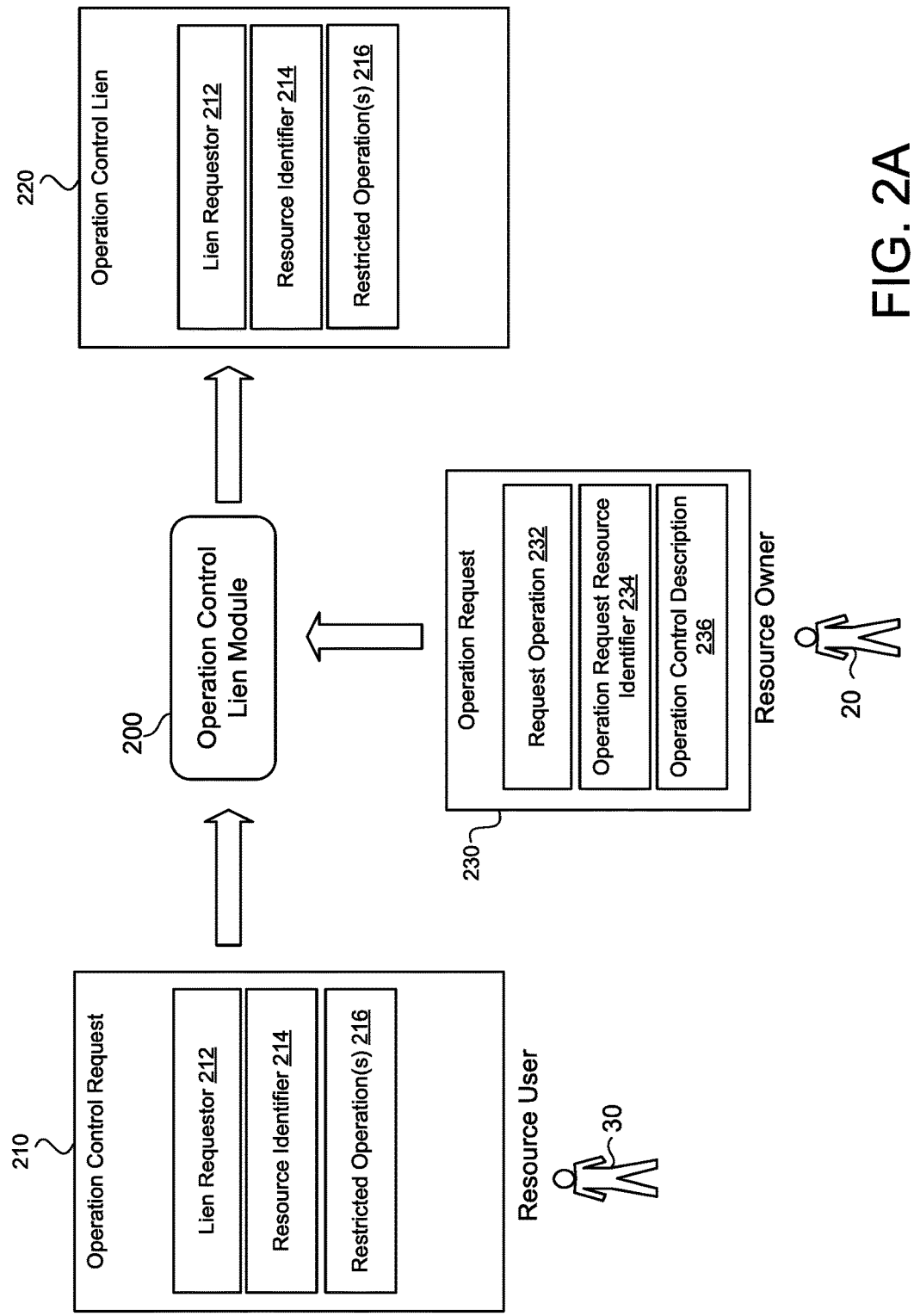
FIG. 2A-2C are block diagrams of example operation control lien modules.

FIG. 2A illustrates an example operation control lien module 200. The operation control lien module 200 receives the operation control request 210. The operation control request 210 identifies a lien requestor 212, at least one resource identifier 214 corresponding to at least one resource 110, and at least one restricted operation 216 for the at least one resource 110 of the distributed system 100. In some examples, the lien requestor 212 is the resource user 30. However, the lien requestor 212 may also be an entity besides the resource user 30 that the resource user 30 designates as the lien requestor 212, such as a manager or a project owner corresponding to the use of the at least one resource 110 relating to the at least one resource identifier 214. Additionally or alternatively, the lien requestor 212 may be a data string providing a name of the lien requestor 212, an identifier of the lien requestor 212, or contact information regarding the lien requestor 212. The at least one restricted operation 216 may be any operation capable of being performed on the at least one resource 110. Some examples of the at least one restricted operation 216 include modifying, editing, updating, or deleting the at least one resource 110. In some examples, the operation control request 210 includes additional fields and/or custom fields, such as a field identifying other resources 110 linked to the at least one resource 110 of the at least one resource identifier 214, a field describing a use of the at least one resource 110, a field identifying a level of severity of the use of the at least one resource 110, or a field of contact information relating to the lien requestor 212 or the resource user 30.

Referring further to FIG. 2A, based on the operation control request 210, the operation control lien module 200 associates an operation control lien 220 with the at least one resource 110 of the at least one resource identifier 214 identified by the operation control request 210. The operation control lien 220 identifies the lien requestor 212, the at least one restricted operation 216, and the at least one resource identifier 214 relating to the at least one restricted operation 216 of the at least one resource 110. In some examples, such as where an operation control lien module 200 seeks to minimize data storage related to an operation control lien 220, the operation control lien 220 may minimally identify the at least one resource 110 via the at least one resource identifier 214 and a related at least one restricted operation 216. Each operation control lien 220 generated by the operation control lien module 200 may be stored within the distributed system 100.

Unlike an access control list (ACL), which is simply a list of permissions attached to an object, the operation control lien 220 identifies the lien requestor 212 and optionally a reason why the operation control lien 220 exists. Moreover, the operation control lien 220 may be agnostic as to specific user permissions and may have a global restriction (e.g., does not allow deletion by anyone). In contrast, a typical ACL merely specifies which users or system processes are granted access to objects, as well as what operations are allowed on given objects. Each entry in a typical ACL specifies a subject and an operation. For instance, a file object having an ACL containing "(Ann: read, write; Brian: read)" provides Ann permission to read and write the file and Brian permission to only read the file. The ACL fails to indicate the author or originator of the ACL or any reason why the ACL exists.

As FIG. 2A illustrates, the operation control lien module 200 may receive an operation request 230 from the resource owner 20 to execute a corresponding operation on a resource 110 of the distributed system 100. In some implementations, the operation request 230 includes a request operation 232 and an operation request resource identifier 234 identifying at least one resource 110. Much like the at least one restricted operation 216, the request operation 232 is a request to execute an operation that modifies, edits, updates, or deletes the at least one resource 110 of the corresponding operation request 230. Additionally or alternatively, the operation request 230 also identifies an operation control description 236 describing the request operation 232 on the at least one resource 110 related to the operation request resource identifier 234.

Figure 2B:
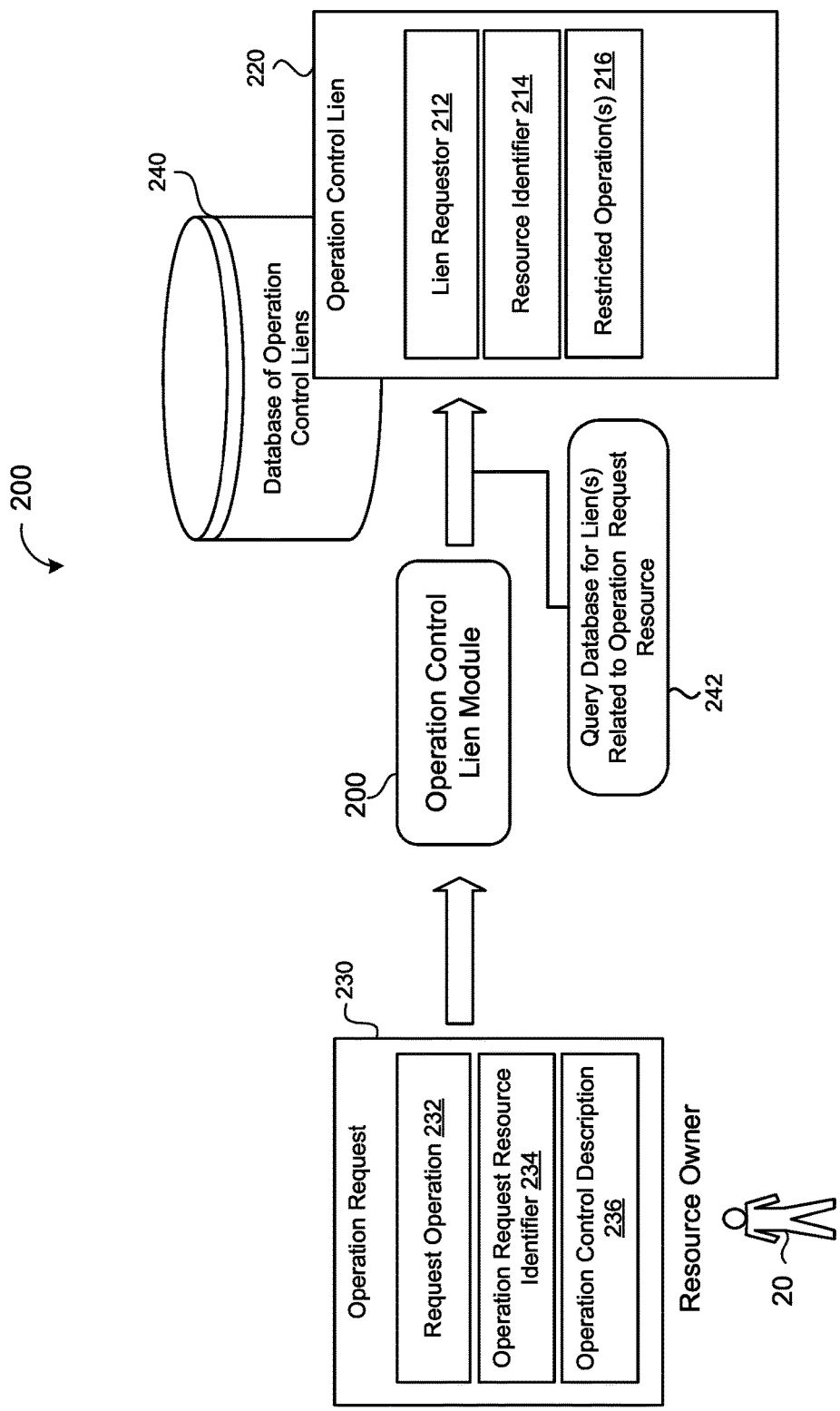

FIG. 2B is another example of an operation control lien module 200. Rather than a lien request process where an operation control lien module 200 receives an operation control request 210 and converts the operation control request 210 to an operation control lien 220, a lien requestor 212 generates an operation control lien 220 based on at least one restricted operation 216 and a corresponding resource 110 of at least one identifier 214. A database 240 of operation control liens 220 may store the operation control lien 220 generated by the lien requestor 212. The database 240 may be part of the distributed system 100 or a separate database accessible to the operation control lien module 200. In some examples, the operation control lien module 200 receives the operation request 230 to execute a corresponding operation on the at least one resource 110 related to the operation request 230 and determines whether the at least one resource 110 has an associated operation control lien 220. For example, the operation control lien module 200 queries the database 240 for operation control liens 220 that relate to the at least one resource 110 of the operation request resource identifier 234.

Optionally, the operation control lien module 200 automatically generates the operation control lien 220 when a resource user 30 uses a resource 110 of the distributed system 100. In some implementations, when the operation control lien module 200 automatically generates the operation control lien 220, the operation control lien module 200 may default the corresponding restricted operation 216 related to the resource 110 of the resource user 30 and/or default the lien requestor 212 as the resource user 30.

Figure 2C:
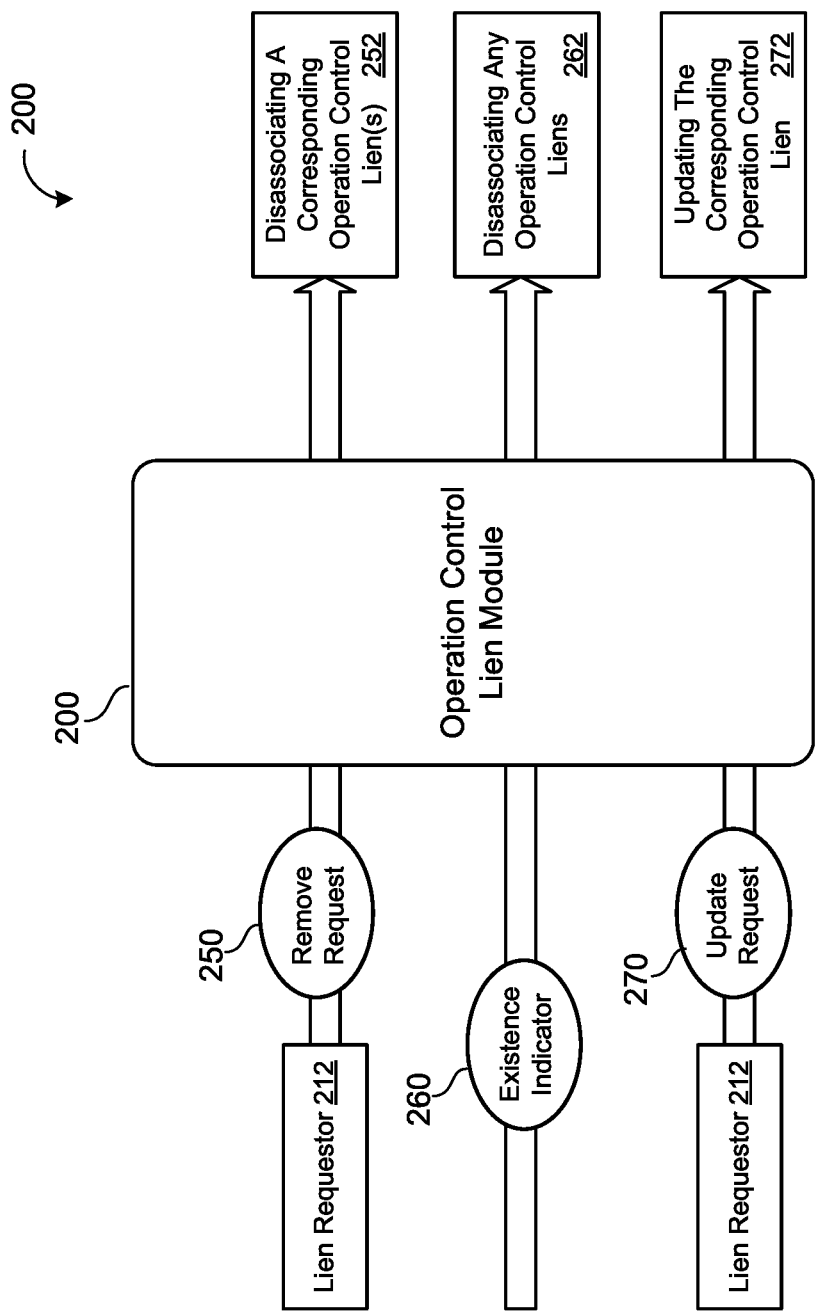

FIG. 2C illustrates additional functions of an operation control lien module 200. Although FIG. 2C depicts the operation control lien module 200 performing each function, an operation control lien module 200 may perform any combination of these functions (e.g., 250-270). In some examples, the operation control lien module 200 receives a remove request 250 from the lien requestor 212. The remove request 250 identifies a resource 110 of the distributed system 100 and a corresponding operation control lien 220 related to the resource 110. In response to the remove request 250, the operation control lien module 200 disassociates 252 the corresponding operation control lien 220 from the resource 110. In these examples, only the lien requestor 212 can remove operation control liens 220 related to a resource 110. By allowing only the lien requestor 212 to remove operation control liens 220, the operation control lien module 200 prevents an entity from disregarding inherent safeguards of an operation control lien 220, such as warning or preventing an entity from performing at least one restricted operation 216 on a resource 110 being used by a resource user 30.

In some implementations, the operation control lien module 200 receives a lien requestor existence indicator 260. The lien requestor existence indicator 260 indicates that a lien requestor 212 corresponding to an operation control request 210 no longer exists. In these implementations, when the operation control lien module 200 receives the lien requestor existence indicator 260, the operation control lien module 200 dissociates 262 any operation control liens 220 based on any operation control requests 210 of the lien requestor 212 for any corresponding resources 110 of the distributed system 100.

Referring further to FIG. 2C, the operation control lien module 200 may receive an update request 270 from the lien requestor 212. The update request 270 identifies a resource 110 of the distributed system 100 to be updated, an operation control lien 220 corresponding to the resource 110, and at least one restricted operation 216 to be updated for the operation control lien 220. When the operation control lien module 200 receives the update request 270 from the lien requestor 212, the operation control lien module 200 updates 272 the operation control lien 220 associated with the resource 110 with the identified at least one restricted operation 216 corresponding to the update request 270.

Figure 3A:
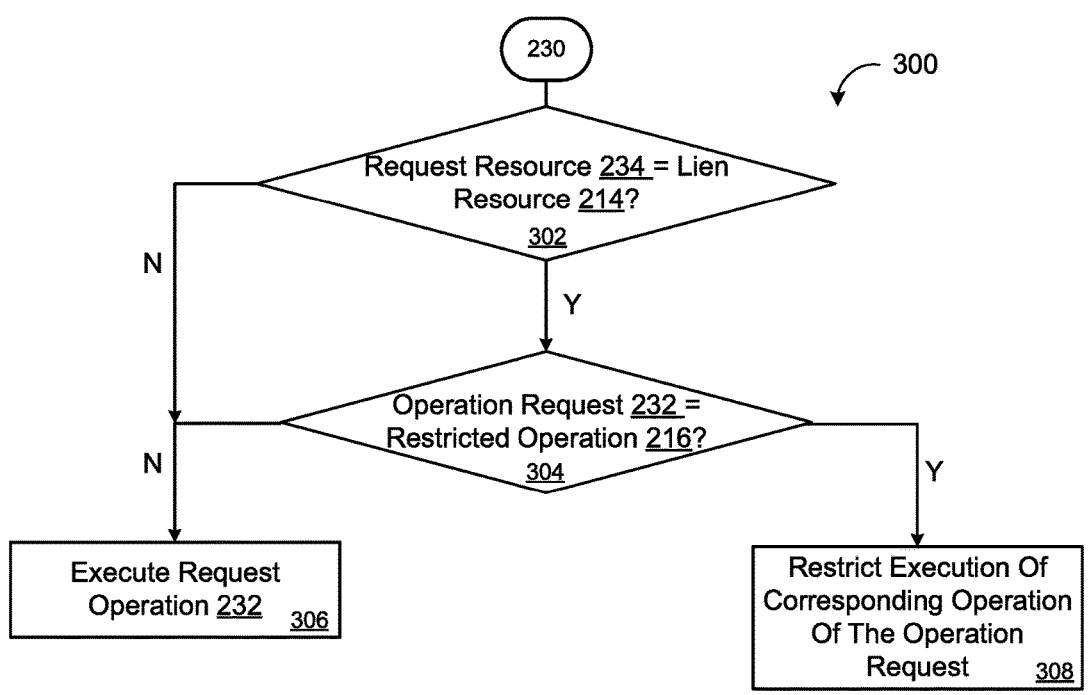
FIG. 3A-3C are example arrangements of operations for evaluating an operation request.

FIG. 3A illustrates an example method 300 for accessing liens on resources 110 of distributed systems 100. Operations associated with the method 300 begin when the operation control lien module 200 receives an operation request 230 to execute a request operation 232 on an at least one resource 110. Referring to FIG. 3A, at 302, the operation control lien module 200 determines whether the operation request resource identifier 234 identifies the resource 110 associated with an operation control lien 220. When the operation request resource identifier 234 identifies the resource 110 associated with the operation control lien 220, the method 300, at 304, determines if the request operation 232 of the operation request 230 is at least one restricted operation 216 identified by the operation control lien 220. At 306, when the operation control lien module 200 determines that the operation request resource identifier 234 does not identify the resource 110 of at least one operation control lien 220 or that the request operation 232 is not at least one restricted operation 216 (e.g., an unrestricted operation not identified by any operation control lien 220), the operation control lien module 200 allows unrestricted execution of the request operation 232 on the resource 110 identified by the operation request resource identifier 234. When, however, the request operation 232 is the at least one restricted operation 216 (e.g., a restricted request operation), at 308, the operation control lien module 200 restricts execution of the request operation 232 corresponding to the operation request 230. In some examples, the operation control lien module 200 restricts execution by denying execution of the corresponding request operation 232.

Figure 3B:
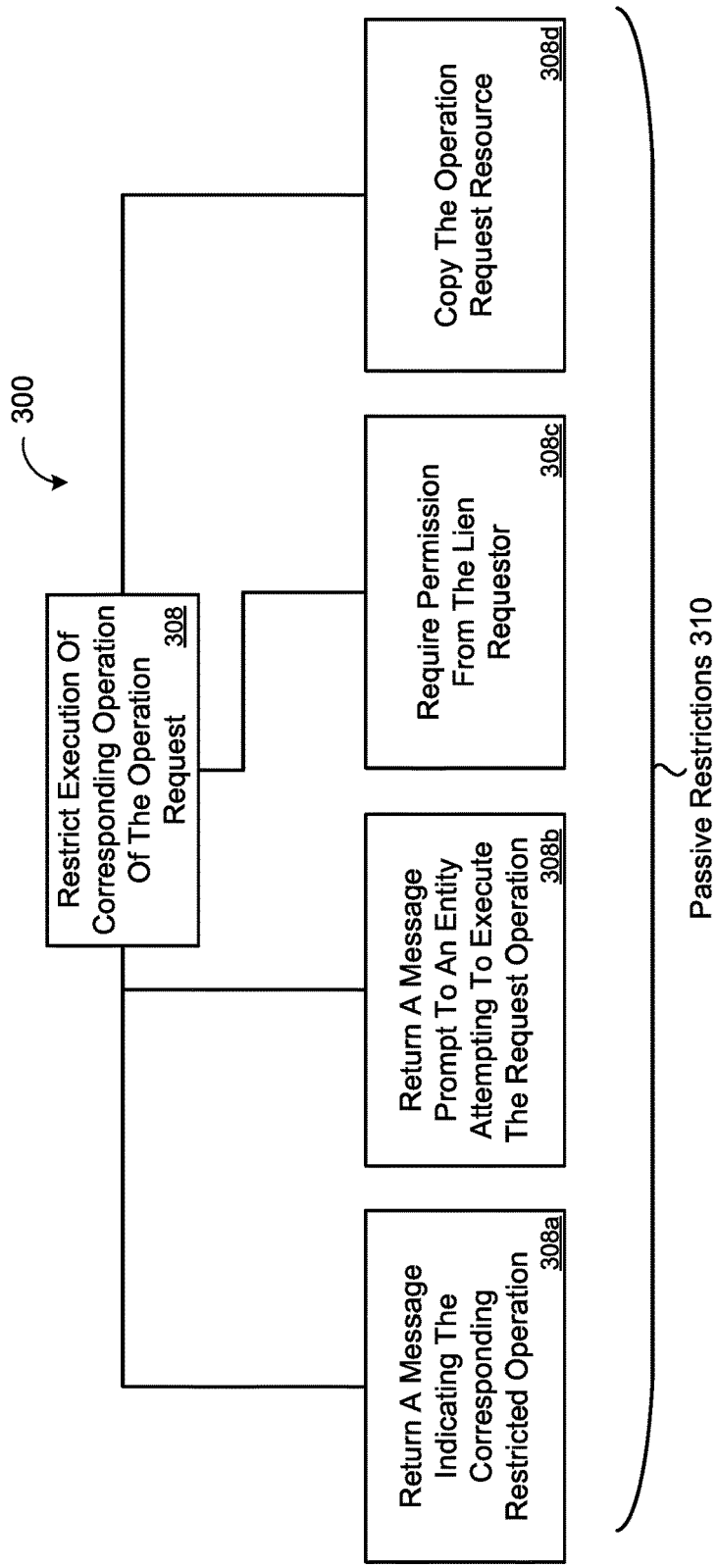

In other implementations as illustrated by FIG. 3B, the operation control lien module 200 restricts execution of the request operation 232 according to passive restrictions 310. The passive restrictions 310 function to prevent immediate performance of the request operation 232 without outright denying the execution of the request operation 232. An operation control lien module 200 may perform any combination of the passive restrictions 310 when the operation control lien module 200, at 308, restricts execution of the request operation 232.

Optionally, at 308a, the operation control lien module 200 returns a message to an entity (e.g., the resource owner 20) that attempts to execute the request operation 232. The message may indicate the at least one restricted operation 216 corresponding to the request operation 232 or the message may indicate other parameters of at least one operation control lien 220 related to the at least one restricted operation 216, such as the lien requestor 212, contact information regarding the lien requestor 212, or any information describing why the lien requestor 212 generated the at least one operation control lien 220.

As another example, at 308b, the operation control lien module 200 prompts an entity (e.g., the resource owner 20) attempting to execute the request operation 232 with a message prompt. The message prompt may ask the entity if the entity wants to proceed with the request operation 232 corresponding to at least one restricted operation 216 in light of the related operation control lien 220 on the resource 110 (e.g., "Are you sure you want to perform this operation when a resource user is using this resource?"). The message prompt functions to give the entity pause for contemplation of any foreseeable consequences of the request operation 232.

In yet other examples, at 308c, the operation control lien module 200 restricts execution of the request operation 232 by contacting the lien requestor 212 associated with the operation control lien 220. For example, at 308c, the operation control lien module 200 requires permission from the lien requestor 212 associated with the operation control lien 220 with the at least one restricted operation 216. In other examples, instead of requiring permission, the operation control lien module 200 communicates with the lien requestor 212 associated with the operation control lien 220 of the resource 110 to indicate that an entity may perform at least one restricted operation 216 identified by at least one operation control lien 220 relating to the lien requestor 212. The communication may allow the lien requestor 212 to prepare for the request operation 232 or communicate further with the entity of the operation request 230. Additionally or alternatively, the operation control lien module 200 may channel communication between the lien requestor 212 and the entity of the request operation 232.

Referring further to FIG. 3B, the operation control lien module 200 may restrict execution of a request operation 232 according the passive restriction 310 at 308d. At 308d, the operation control lien module 200 copies the at least one resource 110 identified by the operation request resource identifier 234. The operation control lien module 200 may copy the at least one resource 110 by producing a full copy of the at least one resource 110 or an image of the at least one resource 110. The operation control lien module 200 may copy the at least one resource 110 automatically or may prompt the entity (e.g., resource owner 20) to copy the at least one resource 110. In some examples, the operation control lien module 200 stores the copied version of the at least one resource 110 in the distributed system 100, but in other examples, the operation control lien module 200 communicates the copy to the lien requestor 212. Additionally or alternatively, the copy of the at least one resource 110 is a temporary file that expires in a pre-determined amount of time after creation (e.g., a default thirty days).

Figure 3C:
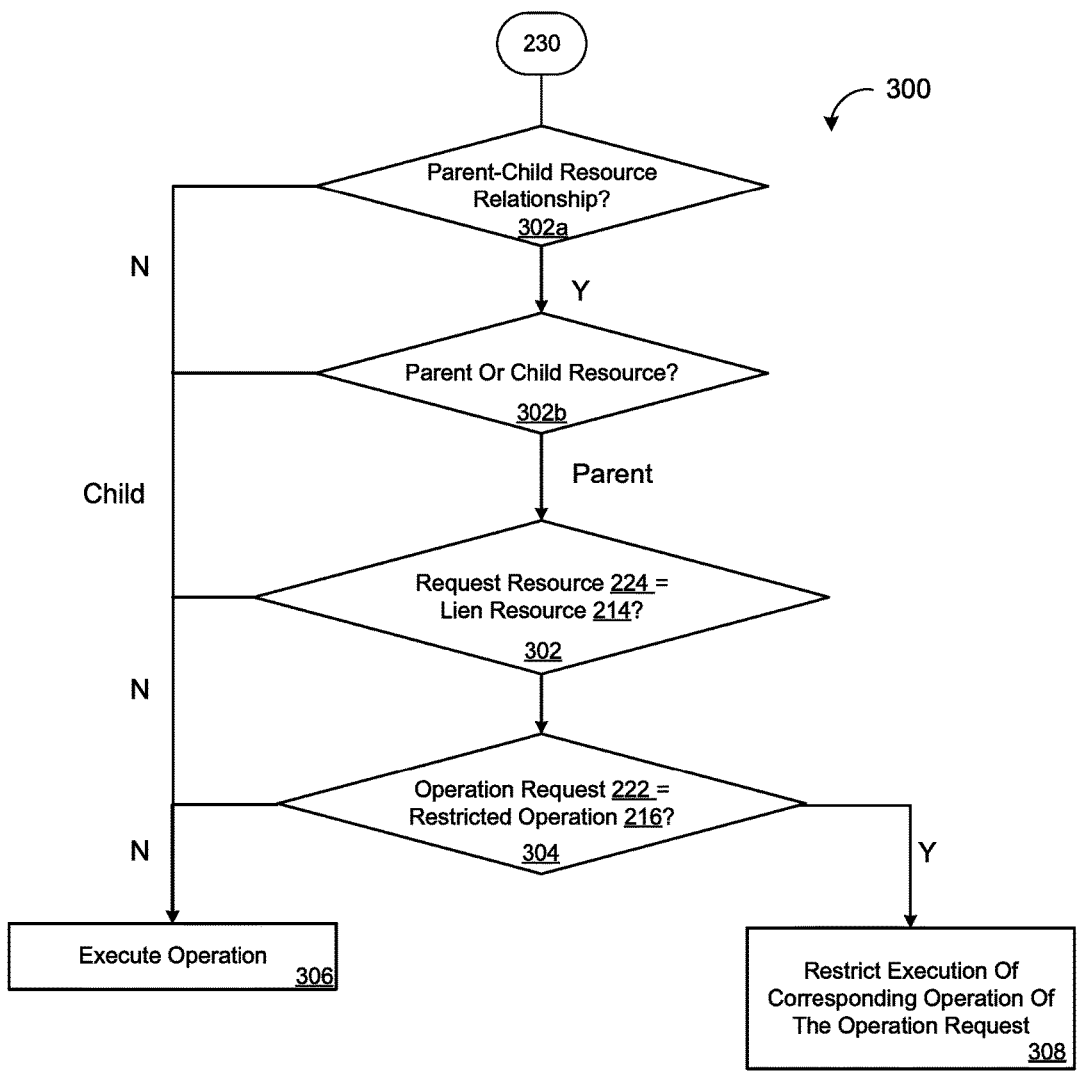

FIG. 3C illustrates an example method 300 for accessing liens on resources 110 of distributed systems 100. Much like FIG. 3A, operations associated with the method 300 begin when the operation control lien module 200 receives an operation request 230 to execute a request operation 232 on an at least one resource identified by an operation request resource identifier 234. Yet unlike the example method 300 of FIG. 3A, in FIG. 3C, when the operation control lien module 200 determines that a request operation 232 is at least one restricted operation 216 of at least one operation control lien 220, the operation control lien module 200, at 302a, also determines whether an resource 110 identified by an operation request resource identifier 234 has a parent-child relationship 110p, 110c with another resource 110 of the distributed system 100. A parent resource 110p is a resource 110 that a child resource 110c depends upon (e.g., for some operation, task, or function). For example, a parent resource 110p is a segment of code used within a larger segment of code (e.g., a function or a compiled set of functions). The child resource 110c is the larger segment of code that depends upon the segment of code of the parent resource 110p. With complex distributed systems 100, resources 110 may have several layers of dependencies with parent-child relationships 110p, 110c. In the case of complicated parent-child relationships 110p, 110c, the dependencies of a resource 110 may not be as apparent to an entity, such as a resource owner 20. For example, if resource A depends on resource B that depends on resource C, a resource user 30 of resource A may not be aware that resource B actually depends on resource C. Therefore, the resource user 30 or the operation control lien module 200 may only associate and/or request an operation control lien 220 for resource B leaving resource C unencumbered by a use of resource A. The unencumbered use of resource A may become an issue when a resource owner 20 of resource C may perform request operations 232 on resource C with unrestricted execution; potentially harming a functionality of resource A.

To prevent such harm, the method 300 of FIG. 3C determines the parent-child relationship 110p, 110c of a resource 110. In some examples, the operation control lien module 200 determines a parent-child relationship 110p, 110c between the resource 110 identified by the operation request resource identifier 234 and other resources 110 of the distributed system 100. At 302b, when the operation control lien module 200 determines a parent-child relationship 110p, 110c, the operation control lien module 200 determines whether the resource 110 is a parent resource 110p having at least one depending child resource 110c. When the resource 110 is a child resource 110c or unrelated to a parent-child relationship 110p, 110c, the method 300 may proceed to 306 and execute the request operation 232 as a child resource 110c does not have any other resources 110 that depend from the child resource 110c (i.e. subject to an operation control lien 220). When the method 300 determines the resource 110 is a parent resource 110p, at 302, the operation control lien module 200 determines whether the resource 110 identified by the operation request resource identifier 234 is also associated with an operation control lien 220. When the resource 110 is associated with the operation control lien 220, the method 300, at 304, determines if the request operation 232 of the operation request 230 is at least one restricted operation 216 identified by the operation control lien 220. At 306, when the operation control lien module 200 determines that the resource 110 is not the resource 110 of at least one operation control lien 220 or that the request operation 232 is not at least one restricted operation 216 (e.g., an unrestricted operation not identified by any operation control lien 220), the operation control lien module 200 allows unrestricted execution of the request operation 232 on the resource 110 identified by the operation request resource identifier 234. When, however, the request operation 232 is the at least one restricted operation 216 (e.g., a restricted request operation), at 308, the operation control lien module 200 restricts execution of the request operation 232 corresponding to the operation request 230.

Figure 4:
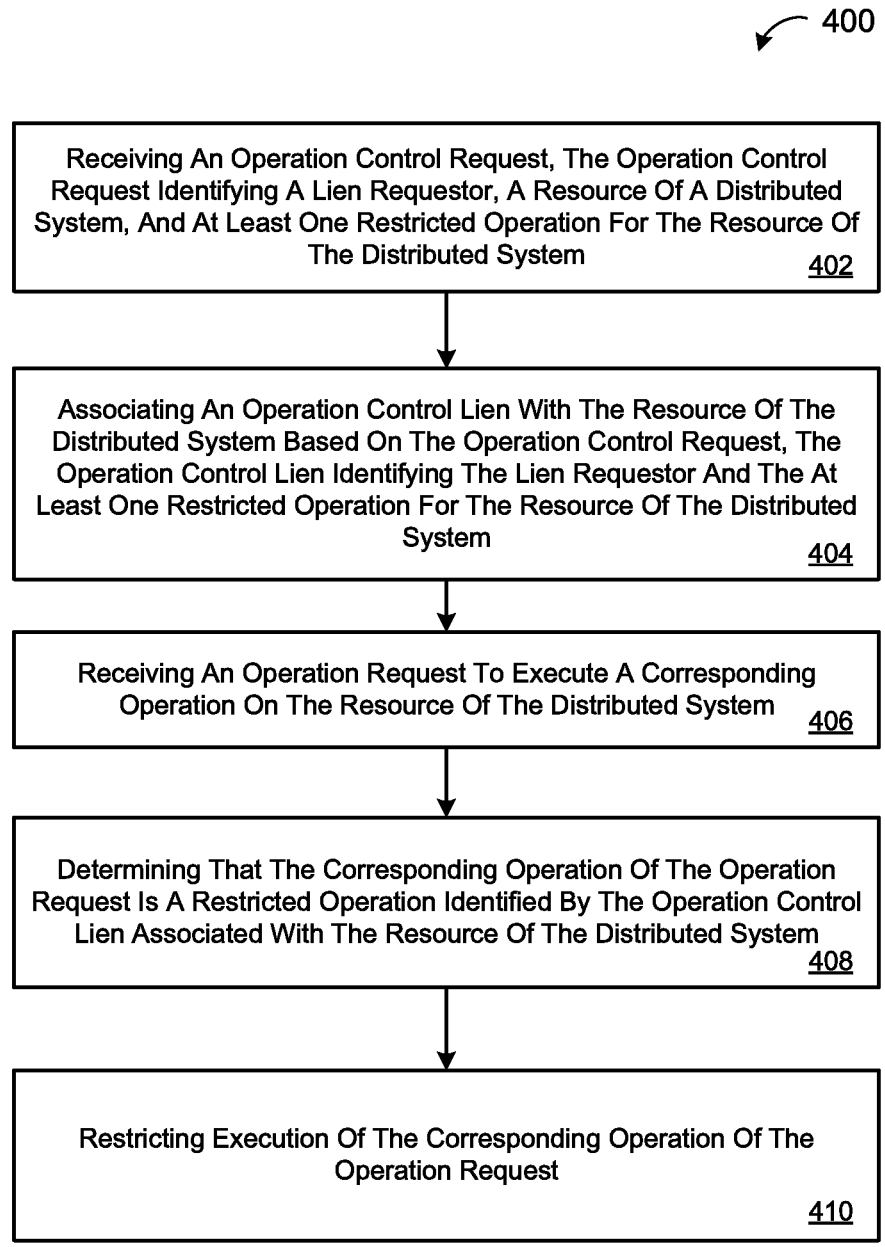
FIG. 4 is an example arrangement of operations performed by an operation control lien module.

FIG. 4 illustrates a method 400 for accessing liens on resources 110 of distributed systems 100. At 402, the method 400 includes receiving, at data processing hardware 112, an operation control request 210. The operation control request 210 identifies a lien requestor 212, a resource 110 of a distributed system 100, and at least one restricted operation 216 for the resource 110 of the distributed system 100. At 404, the method 400 also includes associating, by the data processing hardware 112, an operation control lien 220 with the resource 110 of the distributed system 100 based on the operation control request 210. The operation control lien 220 identifies the lien requestor 212 and the at least one restricted operation 216 for the resource 110 of the distributed system 100. At 406, the method 400 includes receiving, at the data processing hardware 112, an operation request 230 to execute a corresponding operation 232 on the resource 110 of the distributed system 100. At 408, the method 400 includes determining, by the data processing hardware 112, that the corresponding operation 232 of the operation request 230 is a restricted operation 216 identified by the operation control lien 220 associated with the resource 110 of the distributed system 100. At 410, the method 400 further includes restricting, by the data processing hardware 112, execution of the corresponding operation 232 of the operation request 230.

Figure 5:
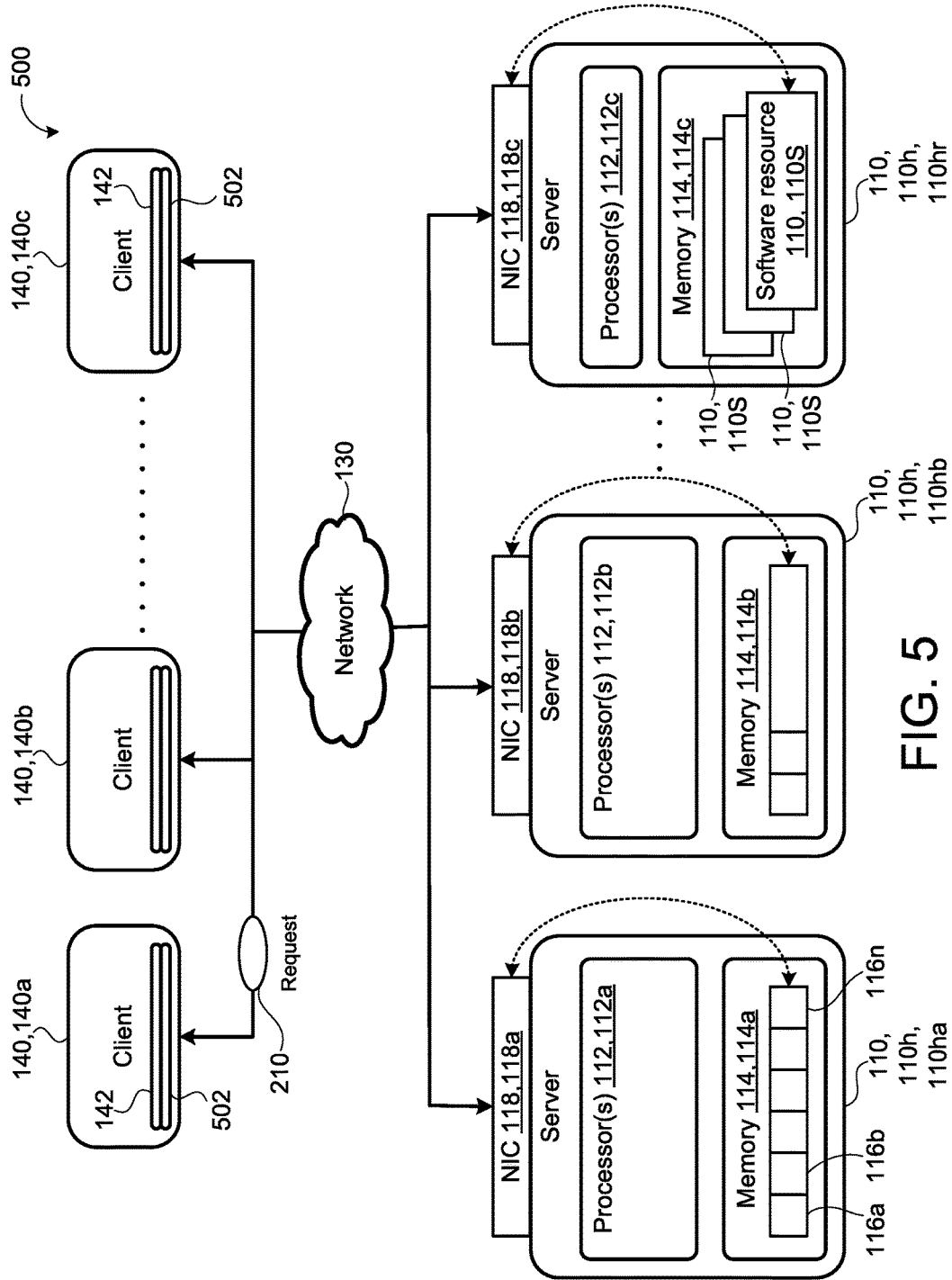
FIG. 5 is a block diagram of an example distributed system.

FIG. 5 illustrates an example distributed system 500. The distributed system 500 includes resources 110. The resources 110 include loosely coupled hardware resources 110, 110h (e.g., data processing devices such as computers or servers), each having data processing hardware 112 (e.g., one or more central processing units (CPUs) or other computing resource) in communication with memory hardware 114 (e.g., memory, flash memory, dynamic random access memory (DRAM), phase change memory (PCM), and/or disks having spindles) that may be used for storing software resources 110, 110s. A storage abstraction (e.g., key/value store or file system) overlain on the resources 110 allows scalable use of resources 110 of the distributed system 500, such as network interface controllers 118, 118a-c, data processing hardware 112, 112a-c, and memory hardware 114, 114a-c, by one or more clients 140, 140a-n (e.g., resource users 30). The clients 140, 140a-c may communicate with the resources 110 and/or communicate an operation control request 210 through a network 130. The distributed system 500 may include multiple layers of redundancy where resources 110 are replicated and/or encoded and stored in multiple data centers. The distributed system 500 with the network interface controller (NIC) 118 may allow a client 140 to directly interface with hardware resources 110, 110h or software resources 110, 110s without requiring execution of a routine on data processing hardware 112. In some implementations, a transaction application programming interface (API) 502 (e.g., a single-sided transactional system client library) is responsible for accessing the underlying resources 110.

Figure 6:
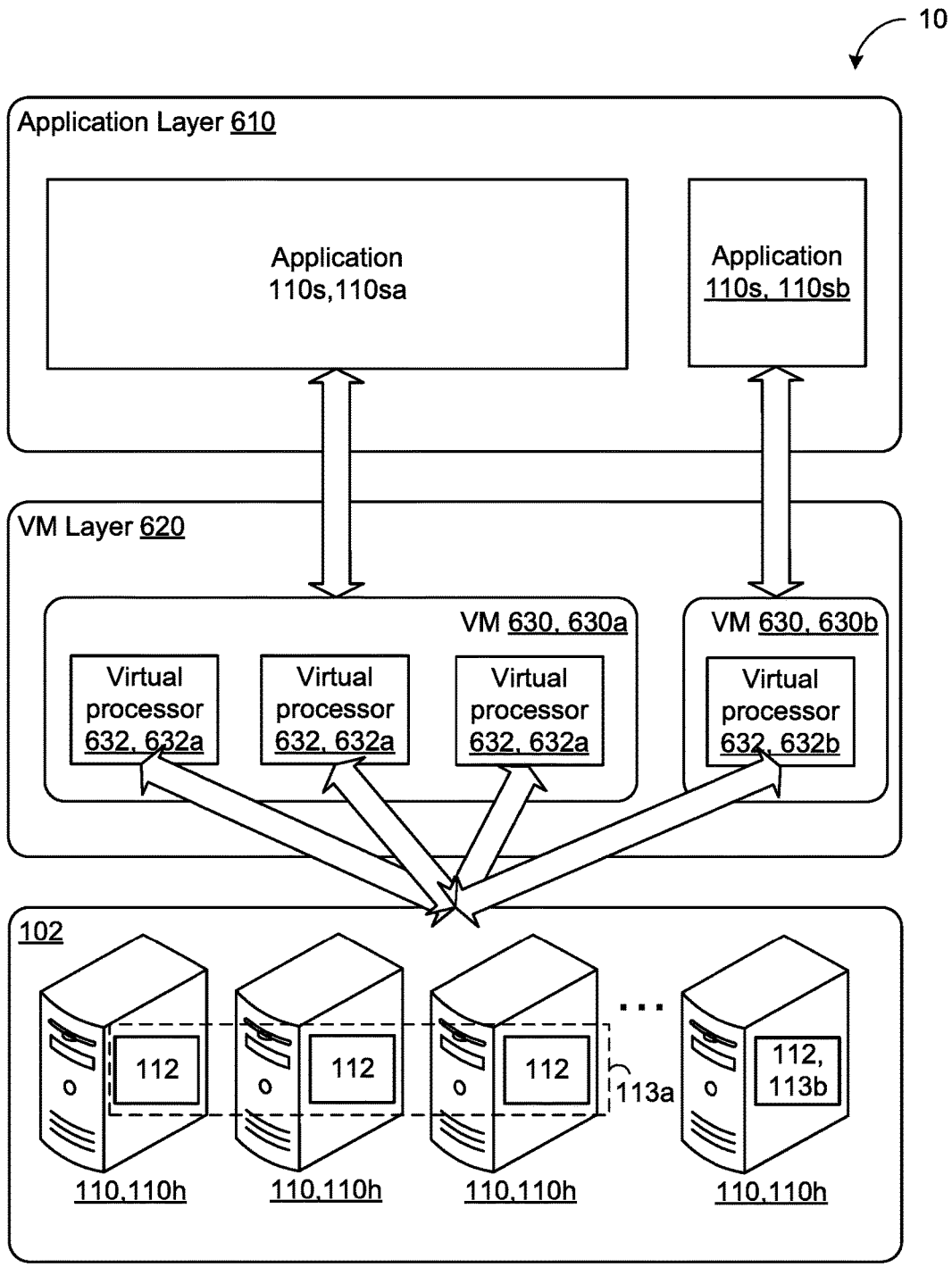
FIG. 6 is a block diagram of an example distributed system.

FIG. 6 illustrates an example resource lien environment 10 with multiple layers. The resource lien environment 10 includes an application layer 610, a virtual machine layer 620 (VM layer) and a distributed system layer 102. Each layer of the resource lien environment 10 may use resources 110 for various operations. For example, the application layer 610 includes applications 110s, 110sa-sb, such as a first application 110sa and a second application 110sb, that utilize software resources 110, 110s. Each software application 110s, 110sa-b may include protocols and functions compiled from shared resources 110 (e.g., code or instructions) within a distributed system 100. In some implementations, hardware resources 110, 110h from the distributed system layer 102 may store or may execute each application 110s, 110sa-sb. For example, memory hardware 114 of the hardware resources 110, 110h stores the applications 110s, 110sa-sb, while data processing hardware 112 of the hardware resources 110, 110h executes the applications 110s, 110sa-sb. In some examples, a virtual machine 630 (e.g., 630a and 630b) of the VM layer 620 executes the applications 110s, 110sa-sb. As depicted in FIG. 6, a first virtual machine 630, 630a executes the first application 110sa and a second virtual machine 630, 630b executes the second application 110sb. A host machine, such as a server (e.g., 110, 110h) may independently operate one or more virtual machines 630 (e.g., 630, 630a-b). When a host machine operates virtual machines 630, a virtual processor 632 of the virtual machine 630 may share the hardware resources 110, 110h of the distributed system 100 associated with the distributed system layer 102. For example, a virtual machine 630 may execute an application, such as the first application 110sa, by emulating a portion 113 of data processing hardware 112 available within the distributed system 100.

Referring further to FIG. 6, a resource user 30 associated with aspects of each layer of the resource lien environment 10 may generate an operation control request 210 and/or a corresponding operation control lien 220. In some examples, a resource user 30 related to the application 110s, 110sa generates an operation control request 210 and/or corresponding operation control lien 220 for the following resources 110: software resources 110, 110s related to the application 110s, 110sa; hardware resources 110, 110h, such as data processing hardware 112 and memory hardware 114 storing and executing the application 110s, 110sa at a distributed system layer 102; and hardware resources 110, 110h that may be operating a virtual processor 632 of a virtual machine 630 executing the application 110s, 110sa on a VM layer 620.

Figure 7:
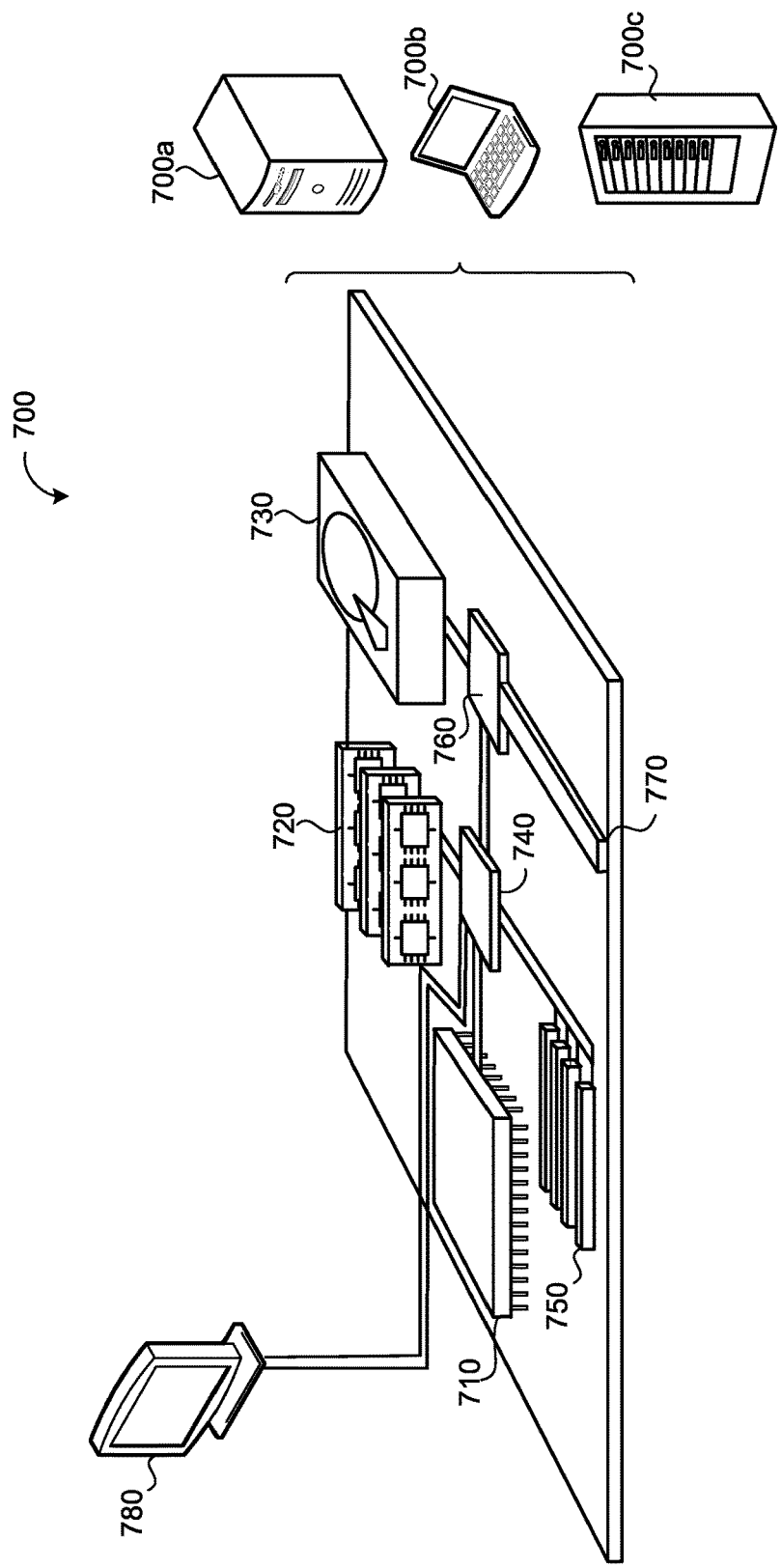
FIG. 7 is a schematic view of an example computing device that may be used to implement the systems and methods described in this document.

FIG. 7 is schematic view of an example computing device 700 that may be used to implement the systems and methods described in this document. The computing device 700 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 700 includes a processor 710, memory 720, a storage device 730, a high-speed interface/controller 740 connecting to the memory 720 and high-speed expansion ports 750, and a low speed interface/controller 760 connecting to a low speed bus 770 and a storage device 730. Each of the components 710, 720, 730, 740, 750, and 760, are interconnected using various busses, and may be mounted on a common motherboard or in other manners as appropriate. The processor 710 can process instructions for execution within the computing device 700, including instructions stored in the memory 720 or on the storage device 730 to display graphical information for a graphical user interface (GUI) on an external input/output device, such as display 780 coupled to high speed interface 740. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 720 stores information non-transitorily within the computing device 700. The memory 720 may be a computer-readable medium, a volatile memory unit(s), or non-volatile memory unit(s). The non-transitory memory 720 may be physical devices used to store programs (e.g., sequences of instructions) or data (e.g., program state information) on a temporary or permanent basis for use by the computing device 700. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 730 is capable of providing mass storage for the computing device 700. In some implementations, the storage device 730 is a computer-readable medium. In various different implementations, the storage device 730 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 720, the storage device 730, or memory on processor 710.

The high speed controller 740 manages bandwidth-intensive operations for the computing device 700, while the low speed controller 760 manages lower bandwidth-intensive operations. Such allocation of duties is exemplary only. In some implementations, the high-speed controller 740 is coupled to the memory 720, the display 780 (e.g., through a graphics processor or accelerator), and to the high-speed expansion ports 750, which may accept various expansion cards (not shown). In some implementations, the low-speed controller 760 is coupled to the storage device 730 and a low-speed expansion port 790. The low-speed expansion port 790, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 700a or multiple times in a group of such servers 700a, as a laptop computer 700b, or as part of a rack server system 700c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A method comprising:
    receiving, at data processing hardware, an operation control request, the operation control request identifying a lien requestor, a resource of a distributed system, and at least one restricted operation for the resource of the distributed system;
    associating, by the data processing hardware, an operation control lien with the resource of the distributed system based on the operation control request, the operation control lien identifying the lien requestor and the at least one restricted operation for the resource of the distributed system;
    receiving, at the data processing hardware, an operation request to execute a corresponding operation on the resource of the distributed system;
    determining, by the data processing hardware, that the corresponding operation of the operation request is a restricted operation identified by the operation control lien associated with the resource of the distributed system; and
    restricting, by the data processing hardware, execution of the corresponding operation of the operation request.

2. The method of claim 1, wherein restricting execution of the corresponding operation comprises denying execution of the corresponding operation.

3. The method of claim 1, further comprising:
    receiving, at the data processing hardware, a subsequent operation request to execute the corresponding operation on the resource of the distributed system;
    determining, by the data processing hardware, that the corresponding operation of the subsequent operation request is an unrestricted operation not identified by any operation control lien associated with the resource of the distributed system; and
    allowing, by the data processing hardware, unrestricted execution of the corresponding operation.

4. The method of claim 3, further comprising:
    receiving, at the data processing hardware, a lien requestor existence indicator indicating that the lien requestor of the operation control request no longer exists; and
    disassociating, by the data processing hardware, any operation control liens based on any operation control requests of the lien requestor from any corresponding resources of the distributed system.

5. The method of claim 3, further comprising:
    receiving, at the data processing hardware, a remove request from the lien requestor, the remove request identifying the resource of the distributed system and the corresponding associated operation control lien previously requested by the lien requestor; and
    disassociating, by the data processing hardware, the corresponding operation control lien from the resource of the distributed system.

6. The method of claim 1, further comprising returning, from the data processing hardware, a message indicating the corresponding restricted operation for the resource of the distributed system.

7. The method of claim 6, wherein the message indicates the lien requestor.

8. The method of claim 6, wherein the operation control request further identifies an operation control description and the message indicates the operation control description.

9. The method of claim 1, wherein determining that the corresponding operation of the operation request is the restricted operation comprises:
    determining a parent-child relationship between the resource of the distributed system and other resources of the distributed system;

determining that the resource of the distributed system is a parent resource having at least one depending child resource; and determining that the parent resource has at least one associated operation control lien.

10. The method of claim 1, further comprising:

receiving, at the data processing hardware, an update request from the lien requestor, the update request identifying the resource of the distributed system, the corresponding associated operation control lien, and at least one updated restricted operation for the control lien; and updating, by the data processing hardware, the corresponding operation control lien associated with the of the resource of the distributed system as identifying the at least one updated restricted operation.

11. A system comprising:

data processing hardware; and memory hardware in communication with the data processing hardware, the memory hardware storing instructions that when executed on the data processing hardware cause the data processing hardware to perform operations comprising:

receiving an operation control request, the operation control request identifying a lien requestor, a resource of a distributed system, and at least one restricted operation for the resource of the distributed system;

associating an operation control lien with the resource of the distributed system based on the operation control request, the operation control lien identifying the lien requestor and the at least one restricted operation for the resource of the distributed system;

receiving an operation request to execute a corresponding operation on the resource of the distributed system;

determining that the corresponding operation of the operation request is a restricted operation identified by the operation control lien associated with the resource of the distributed system; and restricting execution of the corresponding operation of the operation request.

12. The system of claim 11, wherein restricting execution of the corresponding operation comprises denying execution of the corresponding operation.

13. The system of claim 11, wherein the operations further comprise:

receiving a subsequent operation request to execute the corresponding operation on the resource of the distributed system;

determining that the corresponding operation of the subsequent operation request is an unrestricted operation not identified by any operation control lien associated with the resource of the distributed system; and allowing unrestricted execution of the corresponding operation.

14. The system of claim 13, wherein the operations further comprise:

receiving a lien requestor existence indicator indicating that the lien requestor of the operation control request no longer exists; and disassociating any operation control liens based on any operation control requests of the lien requestor from any corresponding resources of the distributed system.

15. The system of claim 13, wherein the operations further comprise:

receiving a remove request from the lien requestor, the remove request identifying the resource of the distributed system and the corresponding associated operation control lien previously requested by the lien requestor; and disassociating the corresponding operation control lien from the resource of the distributed system.

16. The system of claim 11, wherein the operations further comprise returning, from the data processing hardware, a message indicating the corresponding restricted operation for the resource of the distributed system.

17. The system of claim 16, wherein the message indicates the lien requestor.

18. The system of claim 16, wherein the operation control request further identifies an operation control description and the message indicates the operation control description.

19. The system of claim 11, wherein determining that the corresponding operation of the operation request is the restricted operation comprises:

determining a parent-child relationship between the resource of the distributed system and other resources of the distributed system;

determining that the resource of the distributed system is a parent resource having at least one depending child resource; and determining that the parent resource has at least one associated operation control lien.

20. The system of claim 11, wherein the operations further comprise:

receiving an update request from the lien requestor, the update request identifying the resource of the distributed system, the corresponding associated operation control lien, and at least one updated restricted operation for the control lien; and updating the corresponding operation control lien associated with the of the resource of the distributed system as identifying the at least one updated restricted operation.

21. A method comprising:

receiving, at data processing hardware, an operation request to execute a corresponding operation on a resource of a distributed system;

determining, by the data processing hardware, that the resource of the distributed system has an associated operation control lien, the operation control lien identifying a lien requestor and at least one restricted operation for the resource of the distributed system;

determining, by the data processing hardware, that the corresponding operation of the operation request is a restricted operation identified by the operation control lien associated with the resource of the distributed system; and restricting, by the data processing hardware, execution of the corresponding operation of the operation request on the resource of the distributed system.

22. The method of claim 21, wherein restricting execution of the corresponding operation of the operation request comprises denying execution of the corresponding operation.

23. The method of claim 21, further comprising:

receiving, at the data processing hardware, a subsequent operation request to execute the corresponding operation on the resource of the distributed system;

determining, by the data processing hardware, that the corresponding operation of the subsequent operation request is an unrestricted operation not identified by any operation control lien associated with the resource of the distributed system; and allowing, by the data processing hardware, unrestricted execution of the corresponding operation.

24. The method of claim 23, further comprising:

receiving, at the data processing hardware, a lien requestor existence indicator indicating that the lien requestor no longer exists; and disassociating, by the data processing hardware, any operation control liens identifying the lien requestor from any corresponding resources of the distributed system.

25. The method of claim 23, further comprising:

receiving, at the data processing hardware, a remove request from the lien requestor, the remove request identifying the resource of the distributed system and the corresponding associated operation control lien previously requested by the lien requestor; and disassociating, by the data processing hardware, the corresponding operation control lien from the resource of the distributed system.

26. The method of claim 21, further comprising returning, from the data processing hardware, a message indicating the corresponding restricted operation for the resource of the distributed system, the message indicating the lien requestor.

27. A system comprising:

data processing hardware; and memory hardware in communication with the data processing hardware, the memory hardware storing instructions that when executed on the data processing hardware cause the data processing hardware to perform operations comprising:

receiving an operation request to execute a corresponding operation on a resource of a distributed system;

determining that the resource of the distributed system has an associated operation control lien, the operation control lien identifying a lien requestor and at least one restricted operation for the resource of the distributed system;

determining that the corresponding operation of the operation request is a restricted operation identified by the operation control lien associated with the resource of the distributed system; and restricting execution of the corresponding operation of the operation request on the resource of the distributed system.

28. The system of claim 27, wherein restricting execution of the corresponding operation of the operation request comprises denying execution of the corresponding operation.

29. The system of claim 27, wherein the operations further comprise:

receiving a subsequent operation request to execute the corresponding operation on the resource of the distributed system;

determining that the corresponding operation of the subsequent operation request is an unrestricted operation not identified by any operation control lien associated with the resource of the distributed system; and allowing unrestricted execution of the corresponding operation.

30. The system of claim 29, wherein the operations further comprise:

receiving a lien requestor existence indicator indicating that the lien requestor no longer exists; and disassociating any operation control liens identifying the lien requestor from any corresponding resources of the distributed system.

31. The system of claim 29, wherein the operations further comprise:

receiving a remove request from the lien requestor, the remove request identifying the resource of the distributed system and the corresponding associated operation control lien previously requested by the lien requestor; and disassociating the corresponding operation control lien from the resource of the distributed system.

32. The system of claim 27, wherein the operations further comprise returning, from the data processing hardware, a message indicating the corresponding restricted operation for the resource of the distributed system, the message indicating the lien requestor.

* * * * *